United States Patent
Jeong et al.

(10) Patent No.: US 12,118,312 B2
(45) Date of Patent: Oct. 15, 2024

(54) SYSTEMS AND METHODS OF NATURAL LANGUAGE PROCESSING

(71) Applicant: NASDAQ, INC., New York, NY (US)

(72) Inventors: Hyunsoo Jeong, Edgewater, NJ (US); Josep Puig Ruiz, Boston, MA (US); Douglas Hamilton, Boston, MA (US); Niharika Sharma, Cambridge, MA (US)

(73) Assignee: Nasdaq, Inc., New York, NY (US)

( * ) Notice: Subject to any disclaimer, the term of this patent is extended or adjusted under 35 U.S.C. 154(b) by 459 days.

(21) Appl. No.: 17/491,056

(22) Filed: Sep. 30, 2021

(65) Prior Publication Data

US 2023/0103834 A1    Apr. 6, 2023

(51) Int. Cl.
    *G06F 40/289*    (2020.01)
    *G06F 40/30*    (2020.01)

(52) U.S. Cl.
    CPC ............ *G06F 40/289* (2020.01); *G06F 40/30* (2020.01)

(58) Field of Classification Search
    CPC ...... G06F 40/289; G06F 40/30; G06F 40/284; G06F 40/242
    See application file for complete search history.

(56) References Cited

U.S. PATENT DOCUMENTS

| | | | |
|---|---|---|---|
| 8,554,701 B1 * | 10/2013 | Dillard | G06F 40/30 706/12 |
| 11,907,307 B1 * | 2/2024 | Strelnikoff | G06F 16/906 |
| 11,947,916 B1 * | 4/2024 | Agarwal | G06F 40/30 |
| 2018/0189387 A1 * | 7/2018 | Kim | G06F 16/358 |
| 2020/0104359 A1 * | 4/2020 | Patel | G06N 3/045 |
| 2021/0117617 A1 * | 4/2021 | Blaya | G06F 40/253 |
| 2021/0232766 A1 * | 7/2021 | Dhingra | G06F 17/16 |
| 2022/0398382 A1 * | 12/2022 | Bachtiar | G06F 40/30 |

OTHER PUBLICATIONS

Tsukagoshi et al, DefSent: Sentence Embeddings using Definition Sentences, https://arxiv.org/abs/2105.04339, Jun. 9, 2021, pp. 1-8 (Year: 2021).*

* cited by examiner

*Primary Examiner* — Linda Wong
(74) *Attorney, Agent, or Firm* — Nixon & Vanderhye P.C.

(57) ABSTRACT

Natural language processing techniques provide sentence level analysis on one or more topics that are associated with keywords. Indirect learning is used to expand the understanding of the keywords and associated topics. Semantic similarity is used on a sentence-level to assess whether a given sentence relates or mentions a particular topic. In some examples, additional keywords are suggested using filtering techniques in connection with graph embedding-based entity linking techniques.

20 Claims, 10 Drawing Sheets

Top 2 Topics (by number of mentions) in the latest Earnings Transcripts (i.e., Q3 2020) — 402

| | #1 Rank by count | #1 Count | # of Companies | #2 Rank by count | #2 Count |
|---|---|---|---|---|---|
| Focus Company | Growth General | 67 | | 1 Global | 52 |
| Peers | Growth General | 354 | | 6 Covid | 206 |
| Benchmark | Growth General | 12020 | | 246 Macro General | 8577 |

Top increase (delta) in topic mentions from the second most recent quarter (Q2 2020) to the most recent quarter (Q3 2020) — 404

| | #1 Change Topic | #1 Change | #1 Count (Current) | #2 Change Topic | #2 Change | #2 Count (Current) |
|---|---|---|---|---|---|---|
| Focus Company | Macro General | 46 | | 11 Growth General | | 67 |
| Peers | Growth General | 354 | | 75 Partners | | 43 |
| Benchmark | Growth General | 12020 | | 2524 Political | | 867 |

Top decrease (delta) in topic mentions from the second most recent quarter (Q2 2020) to the most recent quarter (Q3 2020) — 406

| | #1 Change Topic | #1 Change | #1 Count (Current) | #2 Change Topic | #2 Change | #2 Count (Current) |
|---|---|---|---|---|---|---|
| Focus Company | Global | 52 | | -18 Regulatory | | 2 |
| Peers | Macro General | 167 | | -93 Covid | | 206 |
| Benchmark | Covid | 3653 | | -841 Global | | 5489 |

SYSTEMS AND METHODS OF NATURAL LANGUAGE PROCESSING

CROSS REFERENCE(S) TO RELATED APPLICATION(S)

"Not applicable."

TECHNICAL OVERVIEW

The technology described herein relates to natural language processing. More particularly, the technology described herein relates to generating sentence level analysis within a body of text and/or providing technology for extracting additional keywords and phrases in connection with natural language processing.

INTRODUCTION

Natural language processing (NLP) is a field of technology that relates to using computers to understand human language. NLP techniques include rule-based systems and machine-learned systems (e.g., using deep neural networks), with the later becoming increasingly relevant to NLP applications. An issue with such techniques is that changes in language and how language is understood by humans has become increasingly rapid. New words and phrases can be quickly adapted by society. A problem with such rapid changes is that having machine-learned systems recognize and understand such changes can be difficult (e.g., due to a model not being trained in connection with such new language). Another problem is that the volume of information that is being produced by society as a whole continues to increase: from new articles, to reports, to posts, to Tweets, and other types of communication. Accordingly, reliance on NLP techniques has become increasingly important as a way to distill information from an ever increasing stream of data. Accordingly, it will be appreciated that new and improved techniques, systems, and processes are continually sought after in this and other areas of technology.

SUMMARY

In certain example embodiments, a computer system is provided for natural language processing. Indirect learning is used to expand the understanding of the keywords and associated topics of interest. Semantic similarity is used on a sentence-level to assess whether a given sentence relates or mentions a particular keyword or topic. In some examples, additional keywords are suggested using filtering techniques in connection with graph embedding-based entity linking techniques.

This Summary is provided to introduce a selection of concepts that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

These and other features and advantages will be better and more completely understood by referring to the following detailed description of example non-limiting illustrative embodiments in conjunction with the drawings of which:

FIG. 4 shows an example of a summary chart that is prepared as a result of the processing performed in FIG. 2;

DETAILED DESCRIPTION

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

Overview

Some embodiments described herein relate to natural language processing (NLP) techniques implemented on computing systems. The described NLP techniques allow for custom or enhanced detection of topics within a body of textual content. The NLP techniques include processing data on topics of interest against a given body of text and applying sentence level semantic processing to determine when a given topic is contained within each (or a given) sentence of the text. Each topic may be associated with one or more keywords and the semantic processing for these keywords in connection with the body of text may be enriched with data from external information sources (e.g., websites) in order to provide contextual data for a given keyword. In some embodiments, NLP techniques may be used to generate additional keywords for a given topic that may then be used in the processing of subsequent bodies of text. In some examples, the techniques herein may be used for automatically analyzing the content of large volumes of text. As an example, the techniques herein may be used to provide contextual information on the topics discussed during seminars, newspaper articles, news reports, company reports (e.g., as related during earnings calls or reports), and other types of textual data.

Figure 1A:
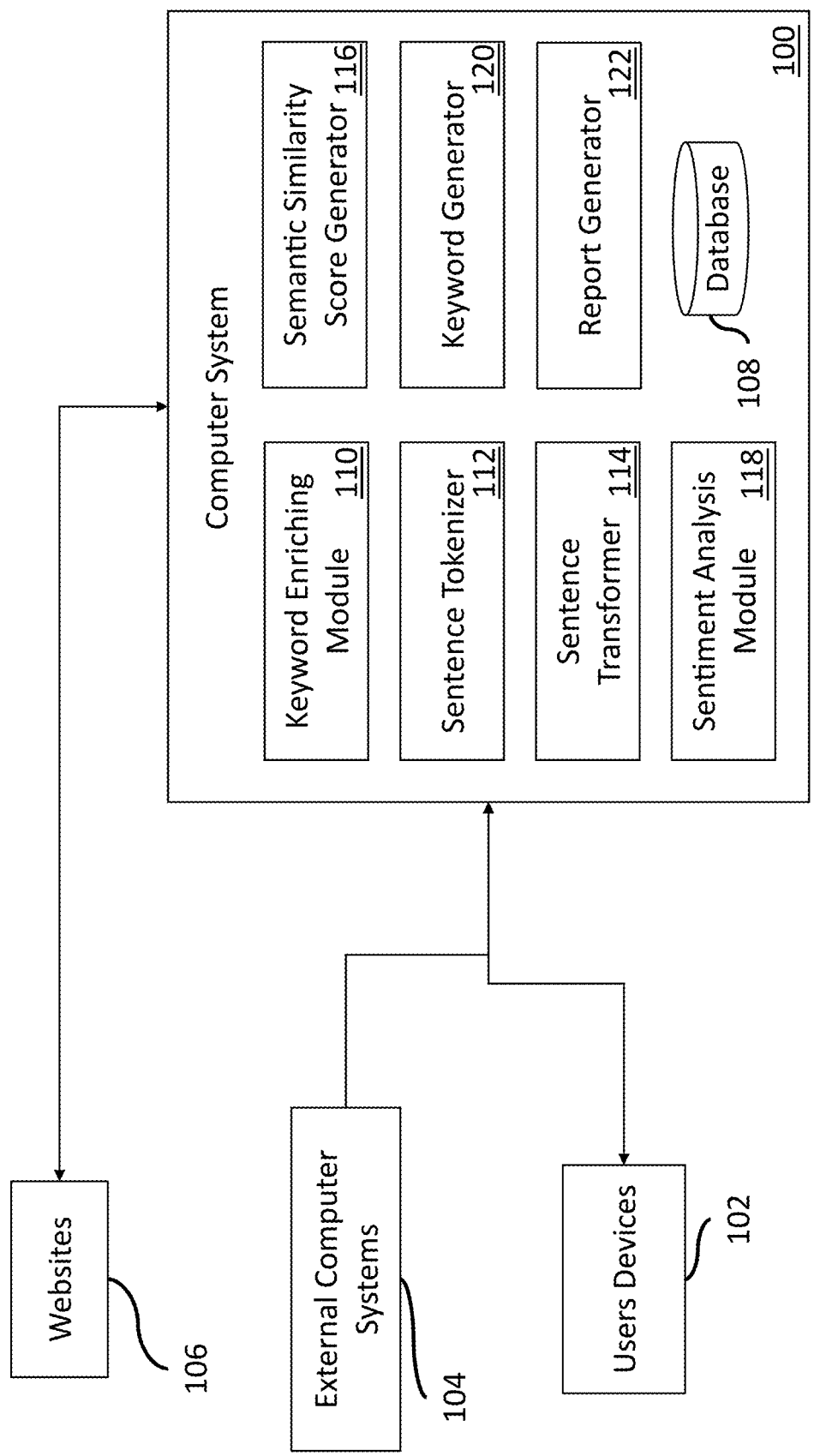
FIG. 1A shows a system architecture according to some embodiments.
Figure 1B:
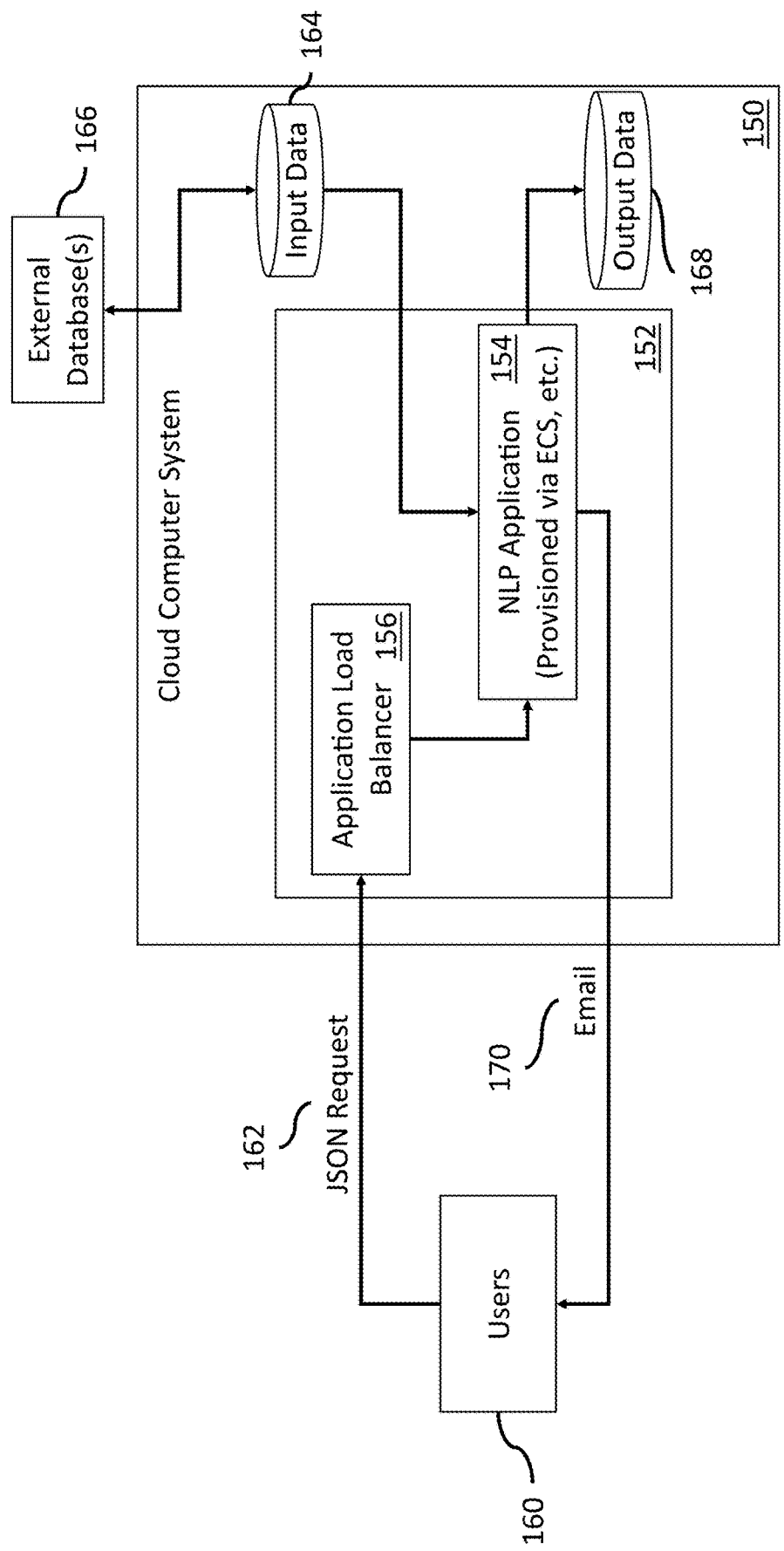
FIG. 1B shows an example cloud computing system architecture as a variation of the example system shown in FIG. 1A.
Figure 2:
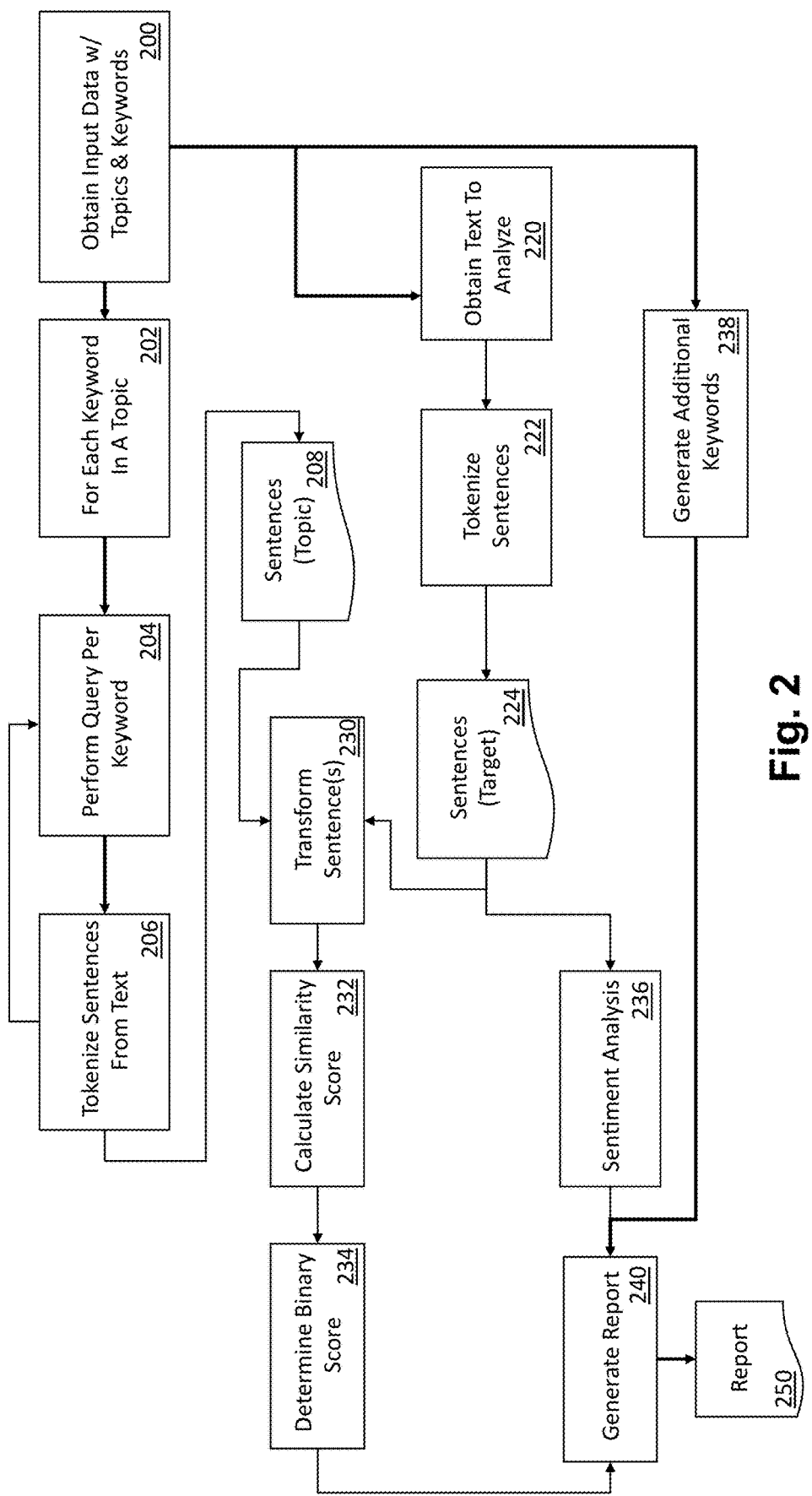
FIG. 2 shows a flow chart of a process that is executable on the system shown in FIGS. 1A-1B according to some embodiments.
Figure 3:
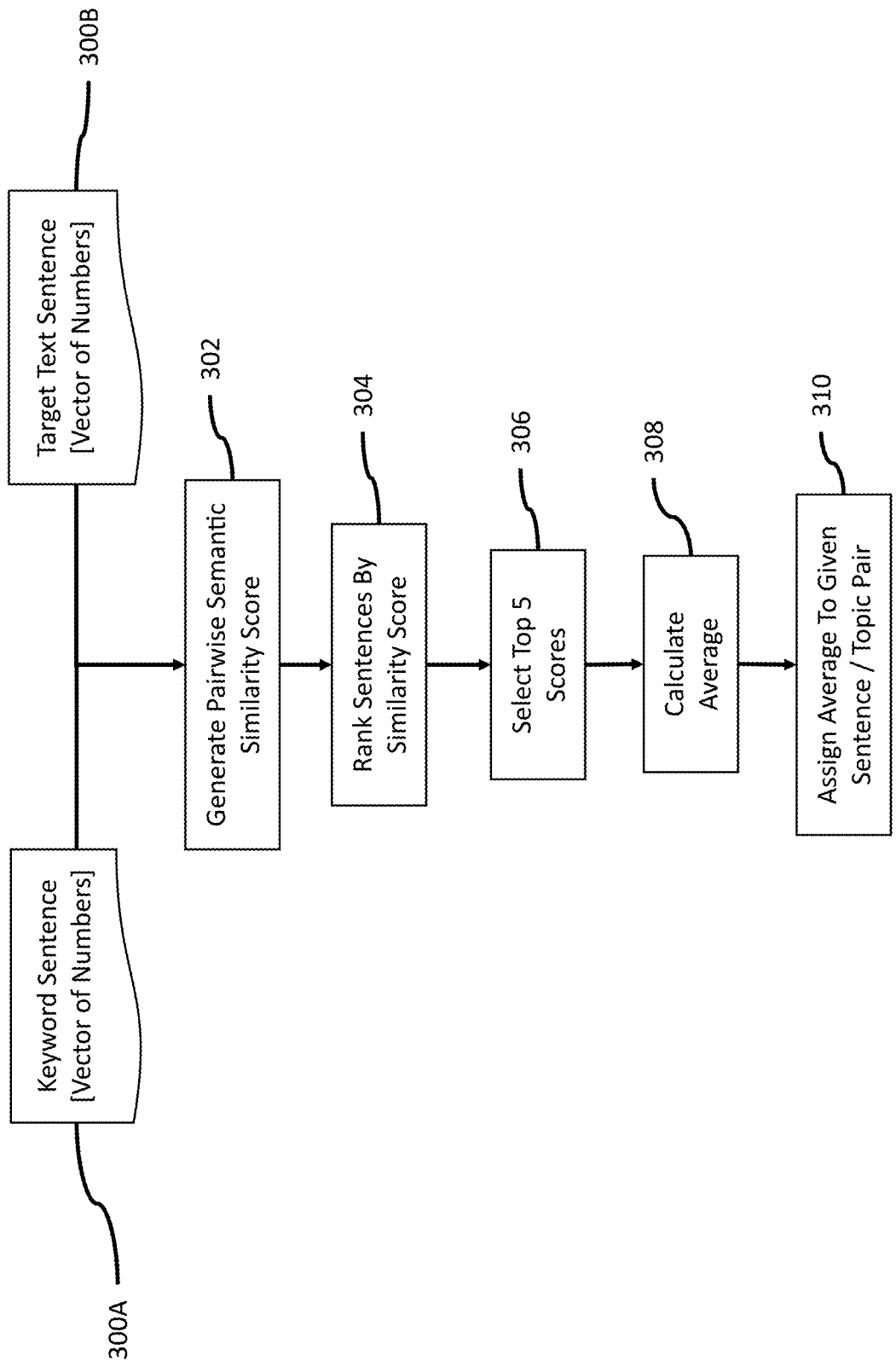
FIG. 3 shows a flow chart of how a semantic similarity score may be calculated for a given topic and sentence in the process shown in FIG. 2 according to some embodiments.
Figure 5:
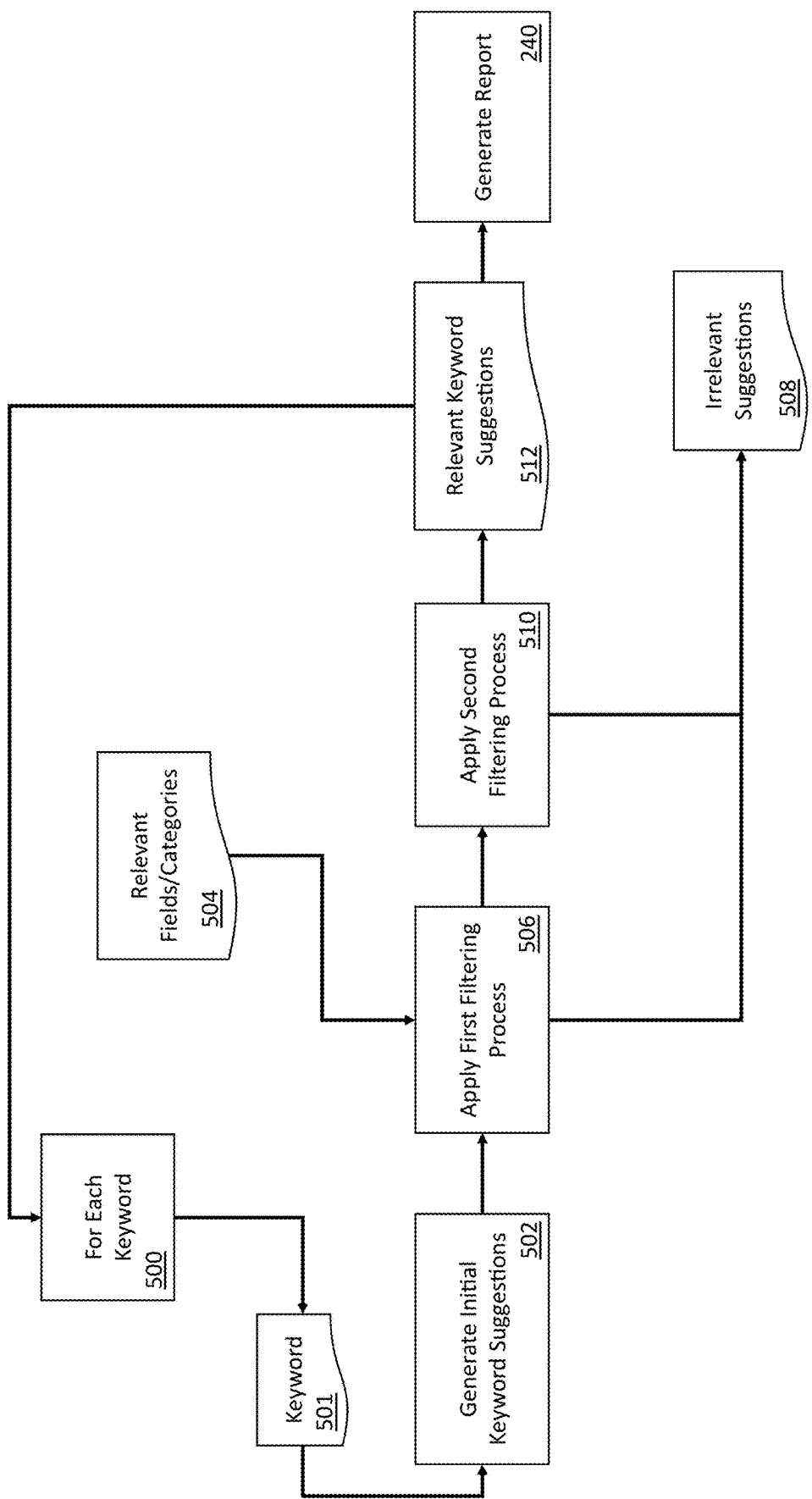
FIG. 5 shows a flow chart of a process for generating additional keywords that may be used in connection with a topic.
Figure 6:
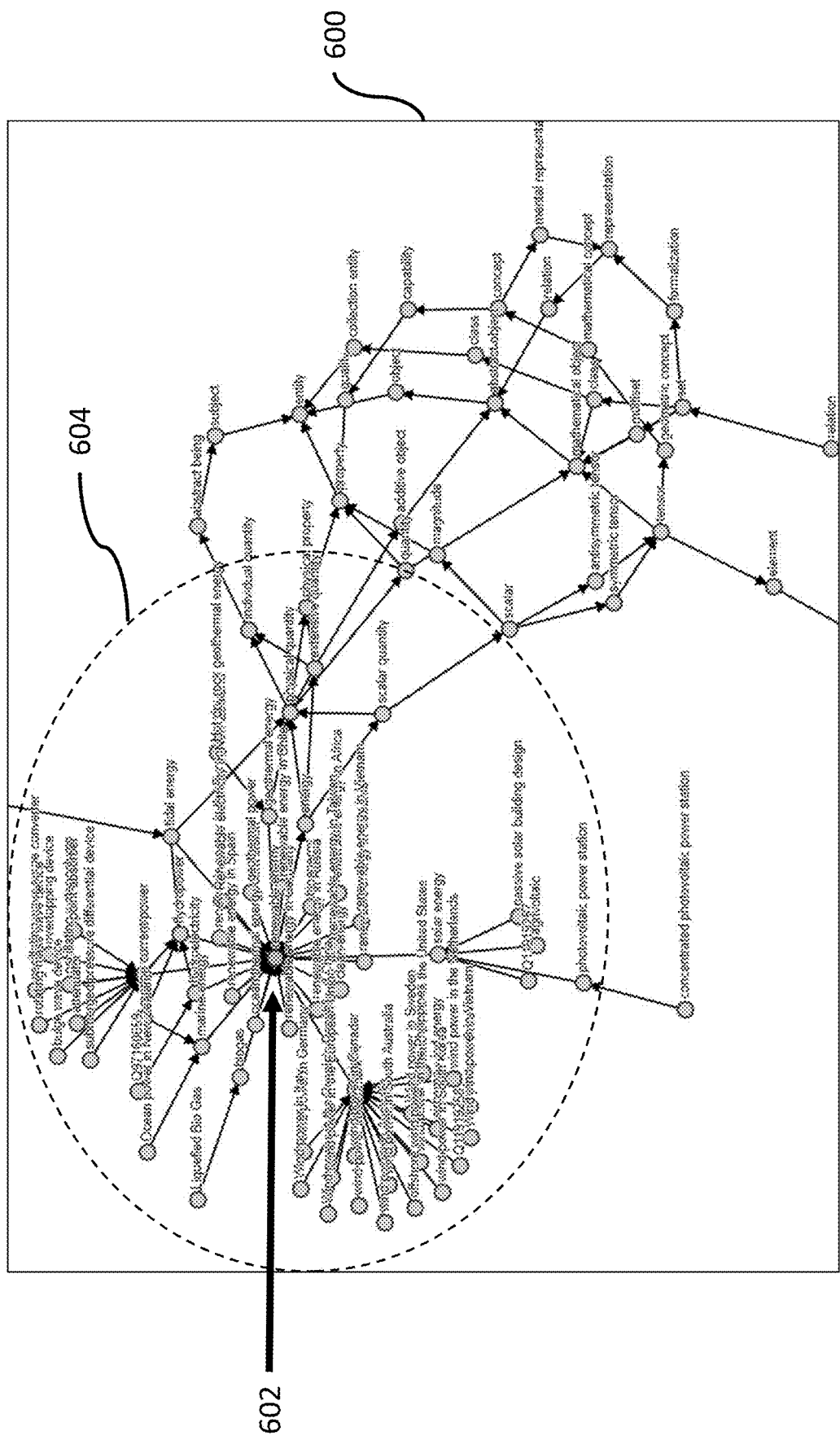
FIG. 6 graphically illustrates a knowledge graph that may be generated as part of the process shown in FIG. 5.
Figure 7:
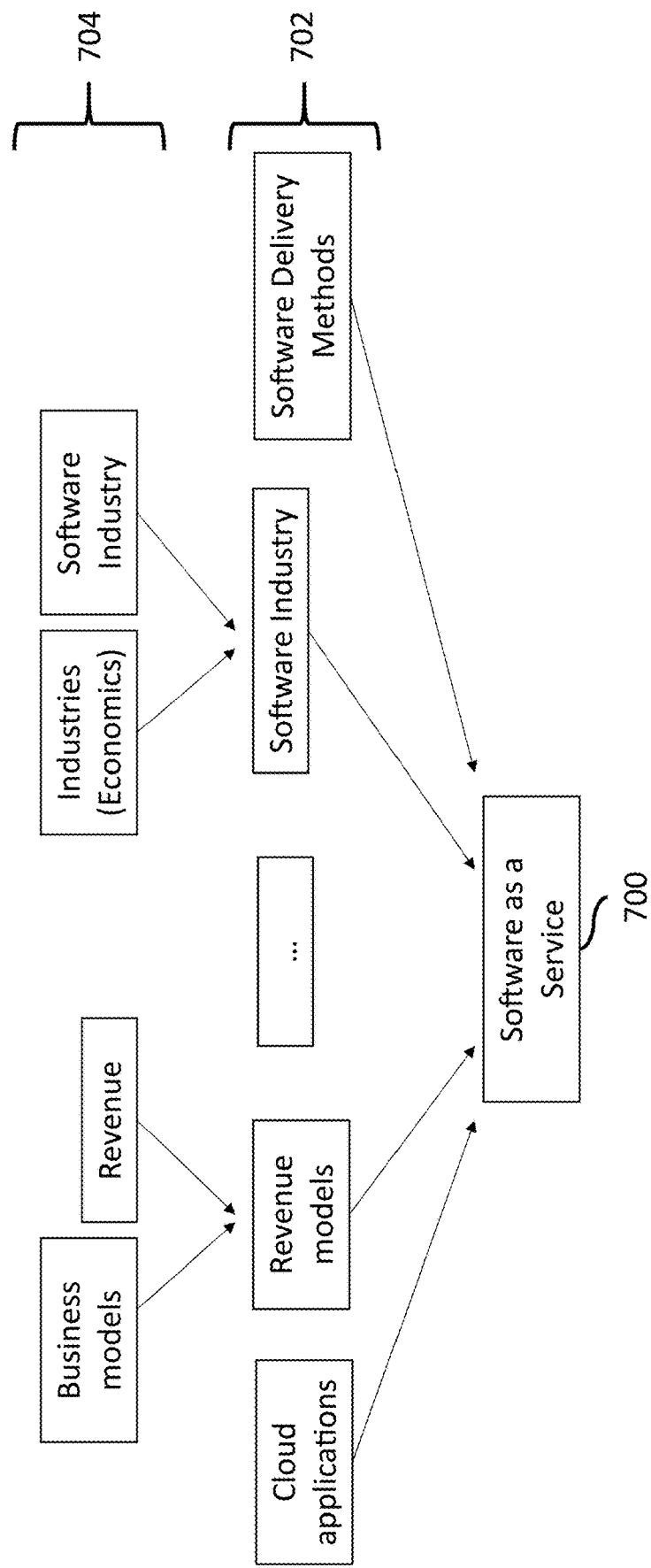
FIG. 7 graphically illustrates how the first filtering process is performed for the process shown in FIG. 5.
Figure 8:
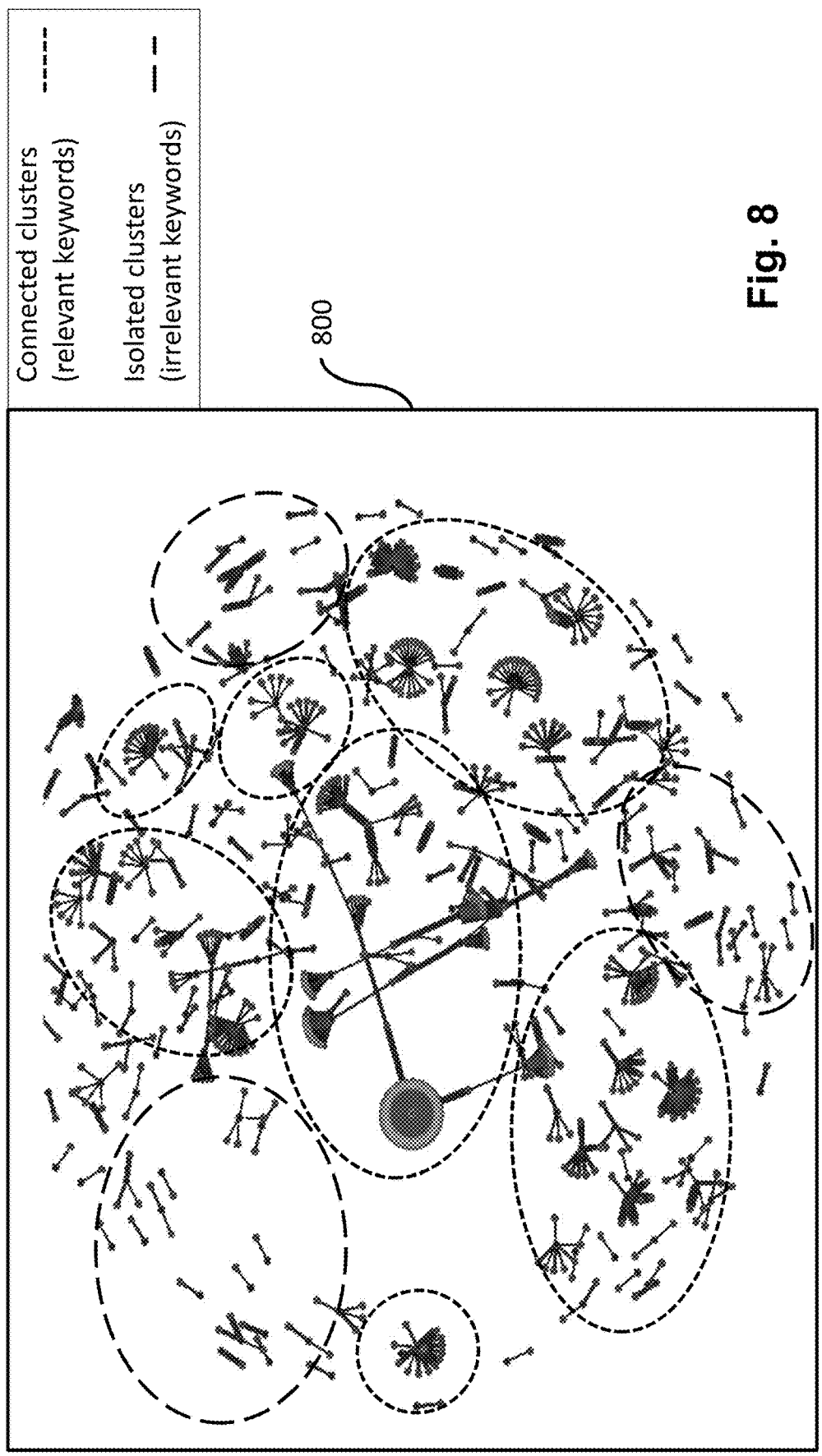
FIG. 8 is a network graph that illustrates how the second filtering process is performed for the process shown in FIG. 5.

The NLP techniques described herein may be implemented on the system shown in FIG. 1A. As a more specific example, the NLP techniques may be implemented in a cloud-based computing environment as shown in FIG. 1B. FIG. 2 shows a flow chart for how the NLP techniques may be performed and FIG. 3 shows a flow chart that details how a similarity score for a given topic to a sentence may be calculated. The process described in FIG. 2 may produce output, of which an example summary is shown in FIG. 4. FIG. 5 illustrates a process that may be performed to generate additional proposed keywords. FIGS. 6-8 graphically illustrate how the different filtering aspects of the process shown in FIG. 5 are performed. FIG. 8 shows an example computing device that may be used for the computer devices and systems discussed in the Figures In many places in this document, software (e.g., modules, software engines, services, applications and the like) and actions (e.g., functionality) performed by such software are described. Examples of such software include the Keyword Enriching Module 110, the Sentence Tokenizer 112, the Sentence Transformer 114, the Sentiment Analysis Module 118, the Semantic Similarity Score Generator 116, the Report Generator 122, and the Keyword Generator 120. This is done for ease of description and it should be understood that, whenever it is described in this document that software performs any action, the action is in actuality performed by underlying hardware elements (such as a processor and a memory device) according to the instructions that comprise the software. As also discussed herein, such functionality may, in some embodiments, be provided in the form of firmware and/or hardware implementations. Further details regarding this are provided below in, among other places, the description of FIG. 9.

Description Of FIG. 1A

FIG. 1A shows a system architecture according to some embodiments. The system shown in FIG. 1A includes computer system 100 with multiple different modules that are programmed to carry out different aspects of the natural language processing techniques discussed herein.

The computer system 100 communicates with user devices 102 that provide input data to specify how textual content that is provided by or retrieved from external computer systems 104 should be processed. Computer system 100 also communicates with websites 106 (also called external information resources herein) as part of the processing that is performed on the textual content. Further details of the processing that is performed is provided in connection with FIG. 2.

Computer system 100 may store a database 108 that is provided in non-transitory memory of the computer system 100. For example, database 108 may be stored in memory devices 904 as discussed in connection with FIG. 9.

User devices 102 allow users to provide input data that both defines what text is to be processed (e.g., to determine the content, context of the text, and/or meaning of the text or sentences within the text) and what type of processing is to be performed on the text. An example of the data (input data) that is provided by the user is shown in Table 1 below. User devices 102 may be implemented using the example computing device 900 of FIG. 9.

The input (e.g., values for parameters) that defines what text is to be processed (also called the target text, target textual data, textual content, or subject text herein) can be provided by users expressly or by reference. Users may specify one or more references to the target text by including, for example, a company name, a time period, a link to a website, and/or any other reference to that may be used by the computer system 100 to retrieve the textual content that is of interest to the user. Any combination of references may be used by the user and the user may provide a list of such references (e.g., that multiple different textual bodies are to be processed). In the example input data that is shown in Table 1 below, the reference data provided by the user includes the name or reference identifier of a company ("A") and one or more relevant time periods (two different quarters of 2020). The data also includes a list of peers that will also be analyzed (e.g., for the same time period). The combination of these two pieces of data may be used by the computer system 100 to retrieve the relevant text (e.g., the earnings report transcript for company A for the identified time periods). The inclusion of peers (or other references) by the user may be used to provide a relative level of the initial target text for the specified topic(s). Peers that are identified may be processed in a manner similar to a target or focus.

In other examples, the reference provided by the user may be to a website, news article, or the like that will be analyzed by the computer system 100. In some examples, the user may specify the text that is to be analyzed expressly by uploading or specifying a file (e.g., a text file) or copying in a string or block of text. In some examples, the user may provide some text expressly (e.g., the focus text) and other text by reference (e.g., peers).

A goal of a user in using the NLP service provided by computer system 100 may be to determine the presence of a given topic or topics within a body of text (or the sentences of that text). Accordingly, the parameters that specify what type of processing is to be performed on the text may include, among other details, topics and associated keywords. As an example, a user may be interested in the topic of "innovation" in the target text and may accordingly specify this topic as part of the provide input. This topic may automatically and/or manually be associated with additional keywords such, for example, "technology", "efficiency", etc. In certain examples, the topic name (e.g., "innovation") may be included as a keyword as well. An example of such topics and keywords is provided below in connection with Table 1. Note that as used herein the term keyword includes both singular words (e.g., "technology") and phrases that comprise multiple singular words. Accordingly, "earnings growth" and "artificial intelligence" are also examples of keywords (or topics).

In certain example embodiments, a database (which may be database 108 in FIG. 1) may store of list of <topic, keyword list>tuples. This may allow the user to specify just the topic. The database can then be used to automatically populate keywords in connection with a user's request for the provided topic.

In some examples, the user may also specify parameters that may be used to indicate a broader benchmark that will be used in comparison to the analysis performed on the indicated text. For example, if a user desires to analyze the textual context of the earnings calls for 4 companies, they may specify a broader market segment (e.g., in which those companies operate). This may be used to provide additional relative contextual information on the topics that are being discussed in connection with the benchmark(s) versus the target text (e.g., each company, both peers and the focus company, that is specified).

In some embodiments, the benchmark information may be the result of averaging and/or otherwise processing already calculated similarity metrics of other text that falls within the specified benchmark.

Additional input data that may be specified by the user may include whether Semantic Similarity processing should be performed. Specifically, when this value is set to true, then the processing shown in FIG. 2 may be performed. However, if this value is set to false, then the processing in FIG. 2 may be skipped. Instead, the computer system 100 may perform a simple word test to determine if any of the provide keywords are mentioned in the target text.

In some examples, the users may provide individual threshold values for each of the topics that are specified. These thresholds may be used in connection with 234 of FIG. 2. In general, as discussed in connection with FIG. 2, a higher threshold will result in fewer sentences being identified as being relevant to a given topic. Different similarity thresholds may be used according to different application needs or different topics. In certain examples, the similarity threshold may be between, for example, 0.6 and 0.7.

In some examples, the input data provided by the user is provided via a formatted JSON request. Table 1 shown below includes an example of the data discussed above in such a format.

TABLE 1

```
{  "company": 11111,
   "peers": [
     22222,
     33333,
     44444 ],
   "semantic_similarity": "true",
   "email": "helloworld@nasdaq.com",
   "time_periods": [
     {  "year": "2020",
        "quarter": "3" },
     {  "year": "2020",
        "quarter": "2" } ],
   "topics": [
     {  "topic": "Software",
        "threshold": 0.65,
        "keywords": [
          "software",
          "cloud",
          "innovation",
          "technology" ] },
     {  "topic": "Growth",
        "threshold": 0.65,
        "keywords": [
          "growth",
          "earnings" ] }
   ],
   "benchmarks": [ {
     "benchmark": "S&P 500",
     "members": [
       41332,
       41461, ...,
       41468,
       41854] } ] }
```

Computer system 100 also communicates with external computer systems 104 that store textual content that may be analyzed. External computer systems 104 may be implemented using the example computing device 900 of FIG. 9. In some embodiments, the external computer systems 104 may hold a database of earning call transcripts or other textual content (e.g., news articles, books, etc.). Based on data specified by the user in the input data, the appropriate text may be retrieved by the computer system 100. For example, the computer system 100 may generate and submit a request to the external computer system 104 for the textual content identified by the user—e.g., the Q2 2020 earnings call for company A. External computer system 104 may retrieve the text from its internal database and then generate an send a response with the requested text to computer system 100 for NLP processing. In some embodiments, the text that is the subject of the analysis request may be stored within computer system 100 and thus no external request for such text may be needed. In some examples, computer system 100 may maintain some or all of the text that can be analyzed in database 108. In some embodiments, the target text may be retrieved from a website or other system.

Computer system 100 includes multiple different modules for handling the functionality associated with the processing discussed herein (as further discussed in connection with FIG. 2). These modules include the Keyword Enriching Module 110, Sentence Tokenizer 112, Sentence Transformer 114, Semantic Similarity Score Generator 116, Sentiment Analysis Module 118, Keyword Generator 120, and Report Generator 122. Each of these modules and their functionality is discussed below.

The Keyword Enriching Module 110 retrieves additional, external data regarding the keywords that are associated with a given topic. As discussed in greater detail in connection with FIG. 2, this process includes querying one or more external websites 106 for information on a given keyword. This approach allows for enriching the keywords that are specified by the user with additional context as to what the keyword "means." This approach can be particularly advantageous in situations in which the keyword is relatively new and thus not factored into existing NLP machine learned models. For example, in 2019 the word COVID may have been relatively unknown. But in the later part of the 2019 and into 2020 (and beyond), it has been more widely understood. Thus, if a user desired to look for references to COVID (or similar topics) in target text, then it is possible that that existing NLP techniques may have missed such references.

In certain example embodiments, the Wikipedia API may be used to retrieve a Wikipedia page in connection with a keyword to allow for greater understanding as to the context of the keyword. In other examples, other types of search databases may be used. It will be appreciated that while external databases or websites may be used to acquire such additional information that in certain examples internal databases may also be used. For example, technical databases or articles (e.g., and stored in database 108) may be compiled into an internal database that may be queried by the Keyword Enriching Module 110 in a manner similar to websites 106.

The Sentence Tokenizer 112 is responsible for tokenizing text that is obtained by the Keyword Enriching Module 110 into sentences. This module may also be used to tokenize the target text (e.g., a transcript, such as an earning call transcript) into sentences.

The Sentence Transformer 114 is a module that transforms (e.g., encodes) each sentence (e.g., both the sentences from the to be analyzed text and the sentences associated with the webpage of keyword) into a vector of numbers. For example, the Sentence Transformer 114 module may take each sentence and transform it into a string or vector of numbers. As a specific example, "The Nasdaq Stock Market is an American stock exchange based in New York City" may be transformed into a vector of the following numbers, "[0.23, 0.56, 0.67, 0.97, 0.05, 0.98, . . . , 0.13]". In certain examples, this encoding is performed by using RoBERTa (Robustly Optimized BERT Pre-training Approach). In some embodiments, a distribution of RoBERTa that maps sentences and paragraphs to a 768-dimensional dense vector space is used. It will be appreciated that other variations of RoBERTa or other language models may be used according to some example embodiments.

The Semantic Similarity Score Generator 116 module generates a semantic score that is based on the semantic similarity of the sentences from a webpage (or other resource) for a given keyword to the sentences of the subject text. In some embodiments, the semantic similarity is performed using the cosine similarity between the numerical vectors generated by the Sentence Transformer 114. The Semantic Similarity Score Generator 116 may be responsible for generating similarity scores for every pairwise combination of sentences associated with a keyword (and thus topic) to a sentence from the target text. Thus, as one example, if there are 2000 sentences in the subject text, and 500 sentences for each of the keywords (e.g., where there may be 10 s or even hundreds of keywords per topic), there may be millions of potential similarity scores being generated.

The Semantic Similarity Score Generator 116 is also responsible for generating the overall similarity score for a given topic/sentence combination. Such a calculation may be performed by, for example, averaging the top 5 or 10 similarity scores for a given topic. The resulting calculated score may then be compared to a threshold value (e.g., as specified in the input data for the given topic) in order to determine whether or not the corresponding topic (or keyword) will be marked as relevant to the given sentence of the subject text. This may then be expressed as a 0 (e.g. not similar) or 1 (indicating similarity to the keyword or topic at hand) or other similar values.

As a simple example, if the term "Covid" is of interest to a user then a sentence of "Last quarter, we were among the first to discuss the business impacts of COVID-19" may have a relevance of 1 (indicating that its similarity score exceeded a given threshold) whereas the sentence "I'm glad he could be here with us on the call" may have a relevance of 0. Similarly, the sentence "Early in the pandemic we took decisive action to secure our global business operations" may also have a relevance of 1. Thus, even though a user may have specified that the topic is "Covid", the process of obtaining external data regarding Covid may provide additional contextual information that may allow for identifying the third sentence as also being relevant.

The techniques described herein thus do more than assess word to sentence similarity (e.g., by encoding each keyword to determine if a given keyword is included in a sentence). Rather, the techniques herein perform similarity assessments between every sentence that is used to describe a keyword (e.g., from a Wikipedia page or the like) to thereby give context to a given keyword when determining if a given topic is present within the sentences of the target text. Such processing allows for "learning" the meaning of keywords and associated topics without having to first train the underlying machine learned model on such terms.

Sentiment Analysis Module 118 is module that is used to determine the sentiment of a given sentence. Sentiment Analysis Module 118 may be programmed to operate by using the FinBERT sentiment analysis model and/or VADER (Valence Aware Dictionary for sEntiment Reasoning) model. In some embodiments, FinBERT may be used in connection with the company that is the "focus" (as shown in Table 1) and companies that are "peers" (also as shown in Table 1). In some embodiments, VADER is used in connection with companies within or associated with a benchmark. Sentiment Analysis Module 118 takes a sentence as input and then returns whether the sentiment is positive, negative, or neutral. In certain example embodiments, the functionality of the Sentiment Analysis Module 118 is provided by an external computing service. As a simple example, the Sentiment Analysis Module 118 may determine that the sentence "The team is really stepping up" has a positive sentiment.

The Keyword Generator 120 is a module that is used to generate or discover additional keywords that may be suggested as keywords to include into the keyword list for a given topic. Further details of the processing that is performed for this module are discussed in connection with FIG. 5.

The Report Generator 122 module is used to generate a report (e.g., a file such as a .CSV, .excel file, a PDF, etc.) that may then delivered to a user. This module may take the results of the other modules (e.g., the Semantic Similarity Score Generator 116) and collate them into a unified format. For example, Report Generator 122 may list each sentence of the subject text in a report and list the similarity results (e.g., I/O) for each topic for each of those sentences. For example, if the subject text had 2000 sentences and 25 topics that are specified, then the report would include each sentence as its own record (e.g., row in a table), with each topic being a column that indicates the corresponding similarity result of that sentence for that topic. Additional data may also include a link the original source material, the sentence number, the speaker (if applicable, such as during an earnings report for a company), the sentiment of the sentence (e.g., as output from the Sentiment Analysis Module 118), and the like.

The Report Generator 122 may also compile additional comparative data and include such information into the report that is being generated. An example of such a report is shown in FIG. 4. For example, a summary of the total number of sentences in the subject text may be included, and, if any comparative subject texts were included, then the NLP results of those may be included as well. In certain examples, the temporal differences between different time periods may be shown to the user (e.g., the difference between Q1 2020 and Q2 2020). In such cases, the report may include data on the relative change (e.g., an increase or decrease) between the different time periods for the specified topics.

Figure 9:
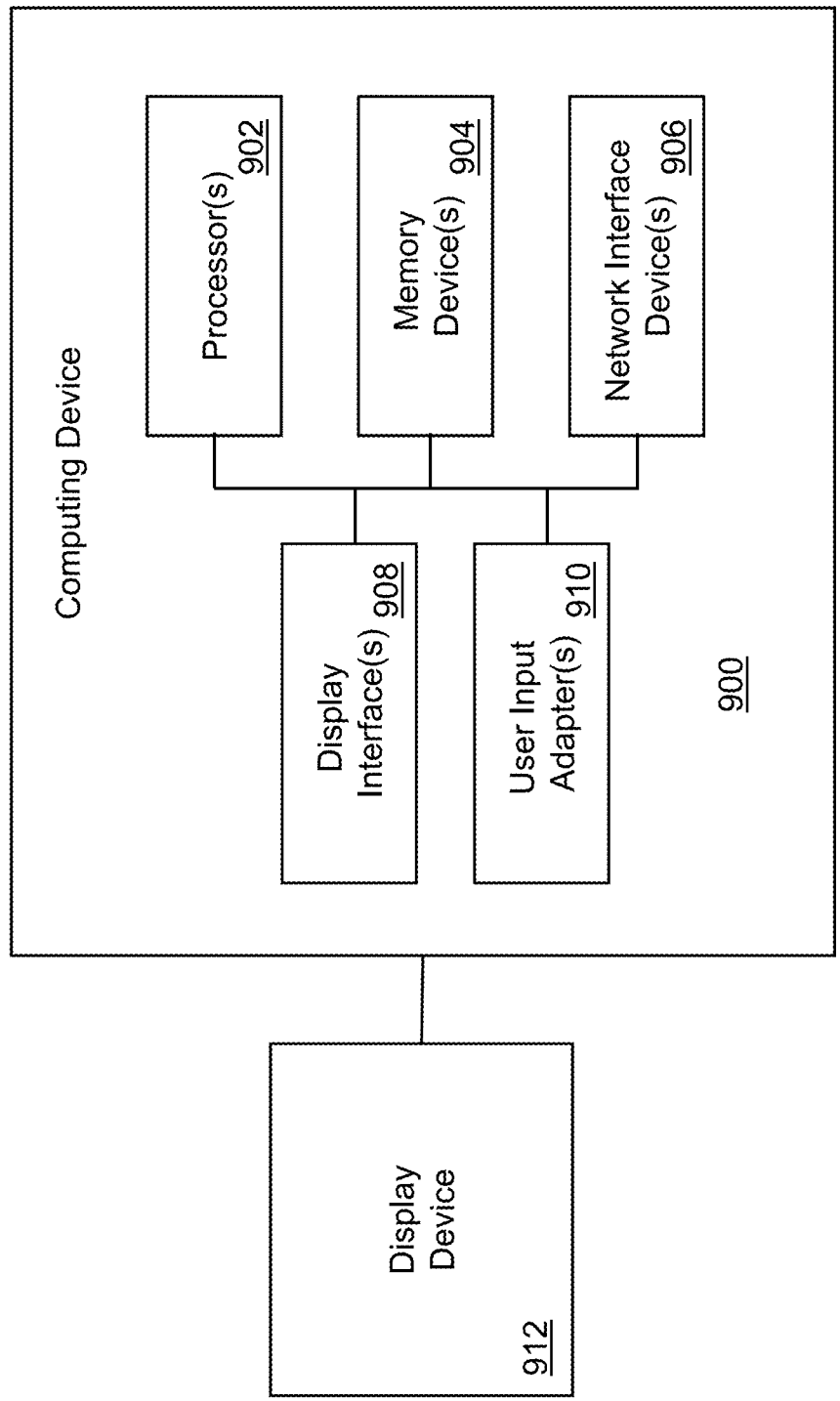
FIG. 9 shows an example computing device that may be used in some embodiments to implement features described herein.

The computer system 100 may be implemented using the example computing device 900 of FIG. 9. The computer system 100 may, in some embodiments, be composed of one or more computing nodes and/or implemented in a cloud-based computing environment. Such an example implementation described in connection with FIG. 1B.

Description Of FIG. 1B

FIG. 1B shows an example cloud computing architecture based on the example system shown in FIG. 1A. The system architecture includes a cloud computer system 150 that includes one or more cloud processing instances 152. An example of cloud processing instance 152 includes Amazon's VPC (Virtual Private Cloud) that is logically isolated within the overall cloud-computing system 150.

In some embodiments, the cloud computer system 150 may be composed of one or more computing nodes, each of which may be the example computing device 900 of FIG. 9. Each computing node has its own computing resources (e.g., hardware components such as electronic memory or storage, input/output (I/O), hardware processors, and the like). In some embodiments, the computing nodes that comprise the cloud computer system 150 may be referred to herein as the "computing resources" of a computer system or the cloud computer system 150. The cloud computer system 150 is an example of a distributed computing system architecture that may be used to implement the techniques discussed herein. Each cloud processing instance 152 and/or each instance of NLP Application 154 may be provided on the same or different computing resources.

Requests 162 transmitted from users 160 (e.g., computing devices being used by users) may be formatted as JSON (JavaScript Object Notation) requests and may include, as discussed above in connection with Table 1, data that defines what text is to be processed (the target text) and what type of processing is to be performed on the text.

The cloud processing instance 152 includes an NLP Application 154, which may include one or more instances of the NLP Application 154 (e.g., to thereby allow multiple applications to be executed in parallel). Cloud processing instance 152 also includes an application load balancer 156 module configured to route requests to perform NLP processing that are received from users 160 to an appropriate instance of the NLP Application 154. In some embodiments, the application load balancer 156 that receives requests from users 160 may rout the requests to an existing instance of the NLP application 154 that is already running and/or may cause a new instance of NLP application 154 to be started.

The NLP application 154 may include any or all of the functionality and/or modules (e.g., Keyword Enriching Module 110—Report Generator 122) that are included with the computer system 100 discussed above. The instances of the NLP application 154 may be provisioned within the cloud computing environment by using a container service, for example, Amazon's Elastic Container Service (ECS) (in the case of using AWS) or other similar container service that use, for example, Docker containers.

Data that is used by the NLP application 154 may be stored in a cloud-computing database (e.g., S3 databases or the like). For example, if the NLP application 154 is used for analyzing transcripts of earnings calls, then the transcripts of such calls may be stored in input database 164 after being retrieved from an external database 166 or service. Similarly, the text of the webpages retrieved for processing by the keyword enriching module 110 may be stored in input database 164.

The generated output from the NLP application 154 (e.g., an excel file, or other document, or data) may be communicated by email 170 or the like to users 160. The generated output from the NLP application 154 may also be stored to output database 168 and may be used in connection with future analysis.

Description Of FIG. 2

FIG. 2 shows a flow chart of a process executed on the system shown in FIG. 1A according to some embodiments.

At 200, input data is obtained that includes topics and associated keywords. An example of input data that has been formatted into JSON is provided above in connection with Table 1. In some examples, users specify the values for the input data through a computer application that accepts input from a user to, for example, select or specify the values that are then included into the input data. In some embodiments, computer system 100 (or another computer system) hosts a web site that allows users to provide input through a web page or the like. In some embodiments, users select the topics and then keywords for the selected topics are automatically included along with the selected topic. As noted above, a database of topic, keyword lists may be stored in advance (e.g., in a database) to automatically allow for inclusion of each associated keyword for a given topic. Thus, a user may not be required to expressly define each keyword for each topic.

In some embodiments, users may manually define one or more keywords for a topic (e.g., instead of, or in addition to those automatically included). As discussed in connection with FIG. 5, a further process for generating additional potential keywords may be performed based on existing keywords. In some embodiments, a user may be presented with a list of such additionally generated keywords and manually select one or more of those additionally generated keywords to include for a given topic.

At 202, the input data is parsed by computer system 100 to extract each keyword for each topic that is defined within the provided input data. For example, a list of keywords may be created. Thus, referring to the example input data shown in Table 1, a list of keywords for the topic "Software" would include the keywords "software", "cloud", "innovation", and "technology". As noted above, the topic name may also be one of the keywords for that topic.

At 204, for each keyword of each topic, a query is generated to obtain a textual description of the corresponding keyword (also called a "multi-sentence description", a "corpus of text", "a body of text", or a "descriptive text body"). As discussed above, in certain embodiments, the textual description may be obtained from a third party service such as the Wikipedia page that is obtained for the keywords in question. For example, if the keyword is "COVID-19", then the textual content of the Wikipedia page at https://en.wikipedia.org/wiki/COVID-19 may be retrieved via an API that is used to access the text that is provided on Wikipedia pages. The collection of textual descriptions that are retrieved for each of the keywords for a given topic may be referred to as the topic textual data (e.g., the sum of the descriptive text bodies retrieved for each keyword associated with a given topic).

It will be appreciated that Wikipedia is used by way of example and that other information sources—both external and internal to computer system 100, may be used to obtain textual descriptions of a corresponding keyword. For example, a commercial encyclopedia database or service may be used. In other situations, a technical database or service may be used and provided internally for computer system 100. In some embodiments, multiple different queries may be used to different services or databases and the resulting text from the different services may be combined and used as the textual description that is subsequently processed.

At 206, the sentences in the textual description that have been retrieved as a result of the query are tokenized. Specifically, the text or data that is retrieved as a result of 204 is split into different sentences.

The process shown in 204 and 206 is repeated for each keyword of a given topic to thereby create a dataset of sentences 208 for a given topic. The processing of 202-206 is also repeated for each topic in the provided input data.

The processing shown from 200-208 results in a dataset of sentences 208 for each topic that have been generated as a result of tokenizing the text for each corresponding keyword of a given topic. This data is then used to determine whether a given topic is discussed in the target textual data. In some embodiments, the resulting dataset of sentences may be stored within database 108 (e.g., to be access during the remaining process elements performed in FIG. 2).

At 220, the target text (e.g., the text that will be analyzed to determine whether the indicated topics are present) is obtained. In certain embodiments, this text is obtained based on the values included in the input data provided at 200. For example, referring to Table 1, the target text that is retrieved is based on the values specified for the "company" and "time_periods" parameters from the input data. Accordingly, in this example embodiment, the target text that is retrieved is the earning call transcripts for the given company for the given time period. In other words, the earning call transcripts for Quarter 2 of 2020 for a company with an ID of 11111 is retrieved from a database of transcripts (e.g., stored in database 108 or provided via external computer system 104). As discussed above in connection with FIG. 1A, different techniques for specifying the target text (e.g., specifying a file, a string of text blob, etc.) may be used according to individual application needs. In any event, the target text that is to be analyzed is obtained at 220.

At 222, the target text is tokenized in a manner similar to 206 to produce a dataset of sentences 224. For example, each sentence that is in the target text may be a row in a dataset that is created.

In some embodiments, the processing that is performed at 220-222 may be performed while the processing at 202-206 is performed. Indeed, the processing of different topics or different keywords in connection with 202-206 may be performed in parallel (e.g., provided processing resources are available).

At 230, each sentence in the sentences dataset 208 and each sentence in the sentences dataset 224 is transformed (e.g., by using the sentence transformer 114) by using word vectorization. Specifically, each sentence is transformed from text into a vector of numbers. Each number in the vector may represent a corresponding word, with each number being between 0 and 1 (or −1 and 1). In some embodiments, the word vectorization is carried out by using the RoBERTa model. As noted above, an example of using word vectorization is where "The Nasdaq Stock Market is an American stock exchange based in New York City" is transformed into a vector of numbers that contains "0.23, 0.56, 0.67, 0.97, 0.05, 0.98, . . . , 0.13". Accordingly, the output from 230 may be a dataset of numerical vectors, with each vector (each of which may be referred to as a vector sentence) corresponding to a respective sentence included in one of datasets 208 and 224.

At 232 a similarity score is calculated for each sentence in the target text to each topic that is included in the input data. The process for calculating a similarity score is discussed in greater detail in connection with FIG. 3. In brief, the similarity score is derived by calculating a semantic similarity between each sentence in the target text and each sentence included with each keyword. In certain embodiments, the similarity score for two sentences is calculated by using the cosine similarity metric, which may be defined as the cosine of the angle between two vectors. Of course other similarity metrics may also be used depending on application need and the like (e.g., dot product, Jaccard, etc.).

Based on the results of the similarity scores calculated at 232, the process applies the threshold value (e.g., obtained from the input data) to determine whether to indicate that a given topic is present in a given sentence from the target text. Thus, for example, if a sentence in the target text has a similarity score of 0.65 or greater for the Software topic, then that sentence will be marked (e.g., with an indicator) as being associated with the Software topic.

Each sentence from the target text and the resulting per topic binary score (and/or the resulting similarity score) are then stored for future use (e.g., to database 108) and/or included into a report 250 that is generated at 240 (discussed below).

In addition to performing similarity analysis, the process may also include performing sentiment analysis on each sentence in the target text. Accordingly, at 236, each sentence from the target text is processed using sentiment analysis to determine the sentiment (a sentiment value) of the sentence. This functionality may be handled by the sentiment analysis module 118 and use, for example, a machine learned model such as FinBERT and/or VADER. The resulting sentiment value that is obtained by processing each sentence through such a model(s) is then stored in connection with the corresponding sentence (e.g., whether the sentence has a positive, neutral, or negative sentiment).

In addition to the processing performed in connection with similarity calculation and sentiment processing, the processing performed by the computer system 100 may also include generating, at 238, proposals for further keywords. The process for generating such additional keywords is described in connection with FIGS. 5-7.

The results of 234, 236, and 238 may all be used as input at 240 to generate report 250. The processing of generating a report may be performed by the Report Generator 122. The report 250 that is generated may include a record of each sentence from the target text and whether the indicated topics apply to each sentence. Table 2 shows an illustrative example of this where sentences A and B are included along with values that indicate the sentiment (determined by 236) and a binary value of whether a given topic (e.g., Growth, Covid, Global, Existing Customers, AI & Automation) applies to the given sentence.

TABLE 2

| Sentence | Sentiment | Growth | Covid | Global | Existing Customers | AI & Automation |
|---|---|---|---|---|---|---|
| [A] | Neutral | 1 | 1 | 0 | 0 | 0 |
| [B] | Positive | 0 | 0 | 0 | 1 | 0 |

The report may also include a listing of potential additional keywords that a user may review. For example, the topic of AI & Automation may have resulted in the following suggested additional keywords (as a result of the processing discussed in FIG. 5)—Automated machine learning; Office automation; Philosophy of artificial intelligence; AI effect; AI takeover; Artificial intelligence; Ethics of artificial intelligence; Robotic process automation; Microsoft Dynamics; Applications of artificial intelligence; History of artificial intelligence; Test automation; Artificial general intelligence; Business process automation.

The report that is generated at 240 may also include a summary. An example summary is shown in FIG. 4. Summary 400 includes different sections 402, 404, and 406 that each include a higher level summary of the details of the processing that has been performed on the target text. For example, section 402 shows a top level count of the most mentioned topic ("Growth General") and how that compares between the Focus Company, its peers, and a benchmark.

Section 404 includes data for how topics have changed (increased) between earning transcripts for Q2 2020 and Q3 2020. Note that in this case "Macro General" changed the most for the focus company while Growth General changed the most for Peers and Benchmark. This type of top level summary allows users to more quickly be presented with trends that may be present—without have to expressly read (or listen) to every earnings call/transcript.

Section 406 includes data for the converse of section 404—data on which topics have a decreased number of mentions between Q2 2020 and Q3 2020.

It will of course be appreciated that other information may be presented based on the underlying analysis performed according to the processing shown in FIG. 2 and/or FIG. 5.

Description Of FIG. 3

FIG. 3 shows a flow chart of a process for how a semantic similarity score may be calculated for a given topic and given sentence in the target text in the process shown in FIG. 2 according to some embodiments.

After a sentence that is associated with a given topic (e.g., associated with one of the keywords for that given topic) has been encoded into a vector of numbers 300A and a corresponding sentence from the target text has been encoded into a vector of numbers 300B, the semantic similarity between the two sentences may be calculated at 302. Each of the calculated semantic similarity scores that are calculated may be referred to as a sentence similarity metric.

In some embodiments, the semantic similarity calculation is performed using the cosine similarity metric that is used to determine the similarity between two non-zero vectors. In this example, the two non-zero vectors are 300A and 300B. The cosine similarity metric may be defined as the cosine of the angle between these two numerical vectors (which may be equal to the inner product of the same vectors). The result of this calculation may be a value between −1 and 1 or between 0 and 1 if used for positive space. A result of −1 indicates that the vectors are opposed. A result of 1 indicates the vectors are the same orientation (thus indicating that the "meaning" of the sentences represented by the vectors are the same). A result of 0 indicates that the vectors are orthogonal.

The processing at 302 is repeated for each sentence that is associated with a given topic for each sentence in the target text. Thus, if there are 5000 sentences associated with a given topic, then there will be 5000 semantic similarity scores calculated for each one of the sentences in the target text. This process is then repeated for each topic that has been specified by the input data.

Once all of the similarity scores have been calculated for a given topic at 302, then they are ranked according to their similarity score (e.g., from highest to lowest or from most similar to least similar) at 304.

At 306, the top number or top percentage of the similarity scores are selected from all of the calculated similarity scores. In some embodiments, the number is 5 or between 3 and 10. In some embodiments, a percentage of the total similarity scores is selected (e.g., 0.001% or some other percentage).

An advantageous technical effect of using multiple ones (e.g., at least 3, at least 4, or at least 5) of the top scores (e.g., as opposed to the top score or top two scores) is that it was observed that selecting just the top score could give biased results in some circumstances. For example, it was observed that generic sentences would sometimes be those sentences with the highest similarity score. Accordingly, using just the top 1 or 2 sentences was determined to not be as accurate as using, for example, the top 5 scores in order to provide "meaning" to sentences in the target text in connection with the given topic.

At 308, based on the top selected number of similarity scores, a further metric or similarity score may be calculated. This metric may be the average of the top selected number of similarity scores and calculated as the mean, median, or mode of those similarity scores that are included in the top selected dataset.

At 310, the calculated average (metric) is then assigned to the given sentence within the target text for that topic. This metric represents the similarity score for the topic to the given sentence. This value is then used as input for the processing performed at 234 in FIG. 2.

Description Of FIG. 5-8

FIG. 5 shows a flow chart of a process for generating additional keywords that may be used in connection with a topic. FIG. 6 graphically illustrates a knowledge graph that may be generated as part of the process shown in FIG. 5. FIG. 7 graphically illustrates an example of the first filtering process that is part of the process shown in FIG. 5; FIG. 8 is a network graph that illustrates the second filtering process that is part of the process shown in FIG. 5.

The process shown in FIG. 5 may be performed by the Keyword Generator 120 discussed in connection with the computer system 100 of FIG. 1A. The process shown in FIG. 5 can be used to generate additional keyword suggestions for each topic that is included in the input data and operates for each of the one or more keywords that are included for each specified topic.

The process starts at 500 by selecting one of the keywords included for a topic. It should be understood that if only one keyword is provided, then the process shown in FIG. 5 will only be performed once.

At 502 an initial dataset of keyword suggestions is generated based on the starting keyword 501. The keyword suggestions may be generated by using a graph based representation (e.g., using, for example, the Resource Description Framework (RDF) standard) of a knowledge-base. Example knowledge-bases include Wikipedia and access to such knowledge bases may be provided via tools such as DBpedia or Wikidata.

In some embodiments, DBpedia is used to generate the knowledge graph by using keyword 501 as a starting point (e.g., as the central node or origin node within the generated graph). Specifically each entity that is mentioned within the knowledge base in connection with keyword 501 may have a corresponding node created within the knowledge graph for that entity. The edge between the origin node (or another node) and the corresponding node may also be created to represent the relationship of the keyword to other keywords within the knowledge base.

As example graphical representation of a part of such a knowledge graph is shown in FIG. 6 where graph 600 shows the node 602 (the origin node) within the graph that corresponds to keyword 501.

Once the graph is generated, then the process determines those nodes that are "close" enough to the origin node. This determination may be performed by specifying that all nodes within a given "distance" of the origin node are to be included. The distance determination may be variable and set according to application needs. A lower distance value will tend to more tightly control the scope of the possible keywords. A high distance value will do the opposite. In some examples, a distance metric of 3 or 4 may be used to indicate 3 or 4 hops away from the origin node. However, other distance metrics may also be used according to various different embodiments.

In any event, a knowledge based graph may be used to select additional keywords that are potentially relevant to keyword 501 and include such keywords into an initial dataset of keyword suggestions.

Once the initial dataset is populated with keyword suggestions, then, at 504, a first filtering process is performed. The first filtering process is performed for each (referred to as the selected keyword below) of the keyword suggestions contained in the initial dataset.

The first filtering process includes performing a recursive search against a knowledge base to obtain all categories that are directly or indirectly associated with the selected keyword. An example knowledge base is Wikipedia where each keyword (e.g., article) is included in at least one category.

The recursive search operates by retrieving all of the categories associated with the selected keyword, and then retrieving all of the categories associated with each of those categories and so on. In some embodiments, the depth of the recursion is at least 3 levels deep, but may be 4, 5, or more levels deep depending on application need. In some embodiments, the depth of the recursion may be controlled manually (e.g., via a variable that is specified by a user) or may be dynamically controlled based on the number of categories that have been obtained or the amount time that has been taken for the recursive search. As an example, a threshold of 100 or 1000 categories may be used as a threshold where the recursion process is performed until the number of categories that have been obtained exceeds the threshold. As other example, a timer many control how long each recursive search is allowed to be performed.

A graphical representation of the recursive process is shown in FIG. 7 where the selected keyword is "Software as a Service" 700. Starting from this keyword, a query is performed by using the Wikipedia API to retrieve the categories for the "Software as a Service" page on Wikipedia. The results of this query are shown as the first layer of categories 702. The search process is then repeated for each of these retrieved categories to obtain a second layer of categories 704 (e.g., a recursion of depth 2). Thus, for example, the category "Revenue Models" in the first layer of categories 702 itself belongs to the categories of "Business models" and "Revenue" that is shown in the second layer of categories 704. As discussed above, this recursion process is repeated a number of times (e.g., a defined recursive depth) to thereby generate a dataset of categories for the selected keyword.

In some embodiments, a predefined list of relevant categories 504 or phrases may be used during or after the recursion process. An example of such a list is shown in Table 3 below.

TABLE 3

["business", "finance", "economics", "technology", "science", "software", "computing", "electronics", "engineering", "transport", "investment", "portfolio"]

In some embodiments, these phrases or words may be used to determine whether any of the categories in the dataset of categories are potentially relevant for the goal of generating additional keyword suggestions. In some embodiments, this is accomplished by determining if any of the provided words (e.g., "software") are used in the category name (e.g., "Software Industry"). In some embodiments, a string comparison is performed against the category name to make this determination (e.g., whether "software" forms any part of the string label for the identified category).

This filtering process can be used to filter out keywords that are not associated with any categories of interest. For example, if the name of a movie is included in the initial dataset of keyword suggestions, and that keyword (e.g., the movie name) would not be of interest to users, then the relevant categories may filter out that keyword to the irrelevant suggestion 508 as none of the categories to which the movie belonged included names with one of the identified terms from 504.

In some embodiments, one or more categories associated with a given one of the keywords from the initial dataset of keyword suggestions needs to be associated with the Relevant Categories list 504. In some embodiments, at least multiple categories that are retrieved for a given one of the keywords from the initial dataset of keyword suggestions needs to be associated with the Relevant Categories list 504. In some embodiments, at least half of categories retrieved for a given one of the keywords from the initial dataset of keyword suggestions needs to be associated with the Relevant Categories list 504. Thus, various modifications may be made to the filtering of categories according application needs.

The keywords from the initial dataset of keyword suggestions that pass the above discussed threshold may be passed onto the second filter process at 506. These keywords may form an intermediate dataset of suggested keywords. Those keywords from the initial dataset that are not associated with categories that fall under the relevant categories 504 are filtered to the irrelevant suggestions dataset 508.

A second filter process is performed at 506 by using a network theory-based selection logic. Specifically, each remaining keyword (i.e., not filtered out by the first filtering process and included into the intermediate dataset of keywords) is associated with one or more categories (which may also be called sub-categories if the indicated category is part of a larger category). For example, software as a service is associated with the cloud applications and software industry categories. From this dataset a baseline network connected graph G is constructed by merging the networks of each keyword—category pair. With |V|=n nodes and |E|=m edges so that G=(V, E). With G generated, then C can be defined a subset of nodes (which may also be referred to as a cluster of nodes, node clusters, or just "cluster") in the network G of a size $|C|=n_c$.

The second filter process then uses the intra cluster density (e.g., the number of points that belong to the neighborhood that represents points of the clusters) and the inter cluster density (e.g., the density between-cluster areas) of the cluster of nodes. These two densities may be defined as follows:

$$\text{intra cluster density: } \delta_{intra}(C) = \frac{\text{\# internal edges of } C}{0.5 * n_c(n_c - 1)} \text{ and}$$

$$\text{inter cluster density: } \delta_{inter}(C) = \frac{\text{\# inter cluster edges of } C}{0.5 * n_c(n_c - 1)}$$

Defining the clusters C within the network G may be performed by executing the following optimization process:

$\Sigma_c \delta_{intra}(C) - \delta_{inter}(C)$ over all clusters C

In other words, this process will select clusters that optimize for the difference between the intra and inter density over all selected clusters.

Clusters within the network G that include relevant keywords may then be identified those that satisfy $\delta_{intra}(C) > \delta(G)$ where $\delta(G)$ is the average edge density of the entire network G.

$$\delta(G) = \frac{\text{\# edges in } G}{0.5 * n(n - 1)}$$

In other words, those clusters that have an intra cluster density that is greater than the average edge density of the entire network can be classified as those that contain relevant keyword suggestions 512. In contrast, those clusters that do not meet this requirement may be filtered out as being irrelevant (and placed into dataset 508).

FIG. 8 illustrates graph 800 and how clusters have been identified according to the above discussed optimization process. Specifically, connected clusters (part of a relevant cluster dataset) that have passed the above-discussed criteria are identified as discussed above and the keywords contained in those areas are added to the relevant keyword suggestions 512. In contrast, clusters in graph 800 that did not meet the indicated criteria indicate keywords that are irrelevant and these may be ignored by being filtered to the irrelevant suggestion dataset 508 (or simply discarded).

The resulting keywords 512 that are remaining after applying the second filtering process may then be incorporated into generation of the report at 240 in FIG. 2.

In some embodiments, the relevant keyword suggestions 512 that are output may be automatically added to the topics to which they are associated. In other embodiments, the relevant keyword suggestions 512 are noted for further review within the generated report 250.

Description Of FIG. 9

FIG. 9 is a block diagram of an example computing device 900 (which may also be referred to, for example, as a "computing device," "computer system," or "computing system") according to some embodiments. In some embodiments, the computing device 900 includes one or more of the following: one or more processors 902 (which may be referred to as "hardware processors" or individually as a "hardware processor"); one or more memory devices 904; one or more network interface devices 906; one or more display interfaces 908; and one or more user input adapters 910. Additionally, in some embodiments, the computing device 900 is connected to or includes a display device 912. As will explained below, these elements (e.g., the processors 902, memory devices 904, network interface devices 906, display interfaces 908, user input adapters 910, display device 912) are hardware devices (for example, electronic circuits or combinations of circuits) that are configured to perform various different functions for the computing device 900. In some embodiments, these components of the computing device 900 may be collectively referred to as computing resources (e.g., resources that are used to carry out execution of instructions and include the processors (one or more processors 902), storage (one or more memory devices 904), and I/O (network interface devices 906, one or more display interfaces 908, and one or more user input adapters 910). In some instances, the term processing resources may be used interchangeably with the term computing resources. In some embodiments, multiple instances of computing device 900 may arranged into a distributed computing system.

In some embodiments, each or any of the processors 902 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 902 uses an instruction set architecture such as x86 or Advanced RISC Machine (ARM).

In some embodiments, each or any of the memory devices 904 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 902). Memory devices 904 are examples of non-transitory computer-readable storage media.

In some embodiments, each or any of the network interface devices 906 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), LTE Pro, Fifth Generation New Radio (5G NR) and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, data is communicated over an electronic data network. An electronic data network includes implementations where data is communicated from one computer process space to computer process space and thus may include, for example, inter-process communication, pipes, sockets, and communication that occurs via direct cable, cross-connect cables, fiber channel, wired and wireless networks, and the like. In certain examples, network interface devices 906 may include ports or other connections that enable such connections to be made and communicate data electronically among the various components of a distributed computing system.

In some embodiments, each or any of the display interfaces 908 is or includes one or more circuits that receive data from the processors 902, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 912, which displays the image data. Alternatively or additionally, in some embodiments, each or any of the display interfaces 908 is or includes, for example, a video card, video adapter, or graphics processing unit (GPU).

In some embodiments, each or any of the user input adapters 910 is or includes one or more circuits that receive and process user input data from one or more user input devices (not shown in FIG. 9) that are included in, attached to, or otherwise in communication with the computing device 900, and that output data based on the received input data to the processors 902. Alternatively or additionally, in some embodiments each or any of the user input adapters 910 is or includes, for example, a PS/2 interface, a USB interface, a touchscreen controller, or the like; and/or the user input adapters 910 facilitates input from user input devices (not shown in FIG. 9) such as, for example, a keyboard, mouse, trackpad, touchscreen, etc.

In some embodiments, the display device 912 may be a Liquid Crystal Display (LCD) display, Light Emitting Diode (LED) display, or other type of display device. In embodiments where the display device 912 is a component of the computing device 900 (e.g., the computing device and the display device are included in a unified housing), the display device 912 may be a touchscreen display or non-touchscreen display. In embodiments where the display device 912 is connected to the computing device 900 (e.g., is external to the computing device 900 and communicates with the computing device 900 via a wire and/or via wireless communication technology), the display device 912 is, for example, an external monitor, projector, television, display screen, etc.

In various embodiments, the computing device 900 includes one, or two, or three, four, or more of each or any of the above-mentioned elements (e.g., the processors 902, memory devices 904, network interface devices 906, display interfaces 908, and user input adapters 910). Alternatively or additionally, in some embodiments, the computing device 900 includes one or more of: a processing system that includes the processors 902; a memory or storage system that includes the memory devices 904; and a network interface system that includes the network interface devices 906. Alternatively, or additionally, in some embodiments, the computing device 900 includes a system-on-a-chip (SoC) or multiple SoCs, and each or any of the above-mentioned elements (or various combinations or subsets thereof) is included in the single SoC or distributed across the multiple SoCs in various combinations. For example, the single SoC (or the multiple SoCs) may include the processors 902 and the network interface devices 906; or the single SoC (or the multiple SoCs) may include the processors 902, the network interface devices 906, and the memory devices 904; and so on. The computing device 900 may be arranged in some embodiments such that: the processors 902 include a multi or single-core processor; the network interface devices 906 include a first network interface device (which implements, for example, WiFi, Bluetooth, NFC, etc.) and a second network interface device that implements one or more cellular communication technologies (e.g., 3G, 4G LTE, CDMA, etc.); the memory devices 904 include RAM, flash memory, or a hard disk. As another example, the computing device 900 may be arranged such that: the processors 902 include two, three, four, five, or more multi-core processors; the network interface devices 906 include a first network interface device that implements Ethernet and a second network interface device that implements WiFi and/or Bluetooth; and the memory devices 904 include a RAM and a flash memory or hard disk.

As previously noted, whenever it is described in this document that a software module or software process performs any action, the action is in actuality performed by underlying hardware elements according to the instructions that comprise the software module. Consistent with the foregoing, in various embodiments, each or any combination of the Computer system 100, user devices 102, external computer systems 104, database 108, Keyword Enriching Module 110, the Sentence Tokenizer 112, the Sentence Transformer 114, the Sentiment Analysis Module 118, the Semantic Similarity Score Generator 116, the Report Generator 122, and the Keyword Generator 120, application load balancer 156, NLP application 154, cloud computer system 150, cloud processing instance 152, each of which will be referred to individually for clarity as a "component" for the remainder of this paragraph, are implemented using an example of the computing device 900 of FIG. 9. In such embodiments, the following applies for each component: (a) the elements of the 900 computing device 900 shown in FIG. 9 (i.e., the one or more processors 902, one or more memory devices 904, one or more network interface devices 906, one or more display interfaces 908, and one or more user input adapters 910), or appropriate combinations or subsets of the foregoing) are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the memory devices 904 (e.g., in various embodiments, in a volatile memory device such as a RAM or an instruction register and/or in a non-volatile memory device such as a flash memory or hard disk) and all actions described herein as performed by the software modules are performed by the processors 902 in conjunction with, as appropriate, the other elements in and/or connected to the computing device 900 (i.e., the network interface devices 906, display interfaces 908, user input adapters 910, and/or display device 912); (c) alternatively or additionally, to the extent it is described herein that the component processes and/or otherwise handles data, in some embodiments, such data is stored in the memory devices 904 (e.g., in some embodiments, in a volatile memory device such as a RAM and/or in a non-volatile memory device such as a flash memory or hard disk) and/or is processed/handled by the processors 902 in conjunction, as appropriate, the other elements in and/or connected to the computing device 900 (i.e., the network interface devices 906, display interfaces 908, user input adapters 910, and/or display device 912); (d) alternatively or additionally, in some embodiments, the memory devices 902 store instructions that, when executed by the processors 902, cause the processors 902 to perform, in conjunction with, as appropriate, the other elements in and/or connected to the computing device 900 (i.e., the memory devices 904, network interface devices 906, display interfaces 908, user input adapters 910, and/or display device 912), each or any combination of actions described herein as performed by the component and/or by any software modules described herein as included within the component.

Consistent with the preceding paragraph, as one example, in an embodiment where an instance of the computing device 900 is used to implement the computer system 100, the memory devices 904 could load the files input data provided by a user, store sentences or the numerical vectors thereof, and/or store the data described herein as processed and/or otherwise handled by the computer system 100 or computer system 150. Processors 902 could be used to operate any of the Keyword Enriching Module 110, the Sentence Tokenizer 112, the Sentence Transformer 114, the Sentiment Analysis Module 118, the Semantic Similarity Score Generator 116, the Report Generator 122, and the Keyword Generator 120, application load balancer 156, NLP application 154, cloud computer system 150, cloud processing instance 152, and/or otherwise process the data described herein as processed by, for example, the computer system 100.

The hardware configurations shown in FIG. 9 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 9, (e) via other hardware arrangements, architectures, and configurations, and/or via combinations of the technology described in (a) through (e).

Technical Advantages of Described Subject Matter

In the machine learning space, using models to generate a word to sentence similarity can be difficult. While it is possible to assess whether a specific word (or some derivation thereof) exists within a sentence. Assessing whether the meaning of a keyword is contained within a sentence can be more difficult. The difficulty can further increase when newer words are used in connection with machine learned models that have not been trained on those newer words. While it is possible to retrain such models to include newer words, such processing can be time consuming and/or computationally expensive. The techniques herein disclose embodiments that operate by obtaining a corpus of text regarding a given keyword and then using the sentences within that corpus of text against a target sentence to determine whether the given keyword is mentioned or otherwise indicated by the sentence. Accordingly, rather than using the keyword directly, a body of text is used to assess whether that keyword is relevant to a given sentence.

In some embodiments, the approach discussed herein allows for leveraging sentence-level similarity techniques in addressing whether a given keyword (or more broadly a topic that may itself include multiple keywords) is mentioned or discussed in a target sentence. Such techniques can advantageously be applied to across large bodies of target texts to assess whether particular topics or keywords are mentioned within such texts. The disclosed approach can be more efficient than, for example, simply retraining an ML model and can more quickly react or understand newer terms that are being used in textual content.

In some embodiments, the techniques discussed herein are flexible in that the obtained corpus of text can be retrieved from sources (such as Wikipedia or other sources) that may be frequently updated (e.g., daily or even hourly). This allows machine learning techniques (e.g., models that have already been trained) to be leveraged in assessing whether newer keywords or topics are being mentioned or discussed within a body of text—without having to retrain such models with newer data. The techniques described in connection with some embodiments herein thus provide efficiency improvements over other techniques that rely upon model retraining.

In some embodiments, the similarity processing results in similarity scores for each sentence in a target text against each sentence of the obtained text body that is used to describe (e.g. impart meaning to) a given keyword. Multiple ones of these scores may then be used to determine whether a given keyword (or broader topic for which that keyword is associated with) is mentioned within the target sentence.

In assessing whether the given keyword in determined to have been mentioned in a given sentence, the embodiments discussed herein provide for calculating a similarity score by using the top 5 or so similarity scores. An advantageous technical effect of using multiple ones of the top scores as opposed to taking the top score is that it was observed that selecting just the top score could sometimes result in biased results. For example, it was observed that generic sentences would sometimes be those sentences with the highest similarity score (as the corpus retrieved for a given keyword would often include generic sentences). Accordingly, using, for example, at least the top 3 (or preferably the top 5) scores was determined to provide, on average, more accurate results than just using the top 1 or 2 sentences in order to provide "meaning" to sentences in connection with the given topic or keyword.

In some embodiments, the techniques described in connection with the generation of additional keywords advantageously provide more relevant keywords through the use of a network graph that filters out keywords deemed irrelevant due to the isolation of such keywords within the network graph.

In some embodiments, the techniques described in connection with generating additional keywords advantageously provide more relevant keywords in an efficient manner by using a combination of filtering processes. A first filtering process uses a recursive categorization search to determine if a potential keyword is contained with a relevant category. The first filtering process is then combined with a second filtering process that uses a network graph to filter out keywords that are isolated within the network graph. The combination of these two filters allows for starting with a broad possible dataset of keywords and efficiently removing irrelevant keywords from the dataset. The first filtering process may be less computationally intensive than the second filtering process, while the second filtering process is able to assess those keywords that are clustered within the relevant categories (and thus potentially relevant). In other words, the use of the first filtering process allows for removal of keywords that are "noise" (e.g. not relevant) from the initial dataset in a relatively computationally efficient manner. The sequential dual filtering process that is performed as discussed herein can provide for increased quality of the resulting suggested keywords (e.g., as opposed to just operating, for example, one of the second filter and the first filter).

Selected Terminology

The elements described in this document include actions, features, components, items, attributes, and other terms. Whenever it is described in this document that a given element is present in "some embodiments," "various embodiments," "certain embodiments," "certain example embodiments, "some example embodiments," "an exemplary embodiment," "an example," "an instance," "an example instance," or whenever any other similar language is used, it should be understood that the given element is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments.

Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an", and "the" should be read as meaning "at least one," "one or more," or the like; the term "example", which may be used interchangeably with the term embodiment, is used to provide examples of the subject matter under discussion, not an exhaustive or limiting list thereof; the terms "comprise" and "include" (and other conjugations and other variations thereof) specify the presence of the associated listed elements but do not preclude the presence or addition of one or more other elements; and if an element is described as "optional," such description should not be understood to indicate that other elements, not so described, are required.

As used herein, the term "non-transitory computer-readable storage medium" includes a register, a cache memory, a ROM, a semiconductor memory device (such as D-RAM, S-RAM, or other RAM), a magnetic medium such as a flash memory, a hard disk, a magneto-optical medium, an optical medium such as a CD-ROM, a DVD, or Blu-Ray Disc, or other types of volatile or non-volatile storage devices for non-transitory electronic data storage. The term "non-transitory computer-readable storage medium" does not include a transitory, propagating electromagnetic signal.

The claims are not intended to invoke means-plus-function construction/interpretation unless they expressly use the phrase "means for" or "step for." Claim elements intended to be construed/interpreted as means-plus-function language, if any, will expressly manifest that intention by reciting the phrase "means for" or "step for"; the foregoing applies to claim elements in all types of claims (method claims, apparatus claims, or claims of other types) and, for the avoidance of doubt, also applies to claim elements that are nested within method claims. Consistent with the preceding sentence, no claim element (in any claim of any type) should be construed/interpreted using means plus function construction/interpretation unless the claim element is expressly recited using the phrase "means for" or "step for."

Whenever it is stated herein that a hardware element (e.g., a processor, a network interface, a display interface, a user input adapter, a memory device, or other hardware element), or combination of hardware elements, is "configured to" perform some action, it should be understood that such language specifies a physical state of configuration of the hardware element(s) and not mere intended use or capability of the hardware element(s). The physical state of configuration of the hardware elements(s) fundamentally ties the action(s) recited following the "configured to" phrase to the physical characteristics of the hardware element(s) recited before the "configured to" phrase. In some embodiments, the physical state of configuration of the hardware elements may be realized as an application specific integrated circuit (ASIC) that includes one or more electronic circuits arranged to perform the action, or a field programmable gate array (FPGA) that includes programmable electronic logic circuits that are arranged in series or parallel to perform the action in accordance with one or more instructions (e.g., via a configuration file for the FPGA). In some embodiments, the physical state of configuration of the hardware element may be specified through storing (e.g., in a memory device) program code (e.g., instructions in the form of firmware, software, etc.) that, when executed by a hardware processor, causes the hardware elements (e.g., by configuration of registers, memory, etc.) to perform the actions in accordance with the program code.

A hardware element (or elements) can be therefore be understood to be configured to perform an action even when the specified hardware element(s) is/are not currently performing the action or is not operational (e.g., is not on, powered, being used, or the like). Consistent with the preceding, the phrase "configured to" in claims should not be construed/interpreted, in any claim type (method claims, apparatus claims, or claims of other types), as being a means plus function; this includes claim elements (such as hardware elements) that are nested in method claims.

Additional Applications of Described Subject Matter

Although examples are provided herein as discussed in connection with earnings transcripts and the like, the technology described herein may also be used, mutatis mutandis, in connection with other textual content such as newspaper articles, books, or transcriptions of audio content.

Although process steps, algorithms or the like, including without limitation with reference to FIGS. 2-5, may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

The invention claimed is:

1. A computer system for performing natural language processing, the computer system comprising:
   a processing system comprising instructions that, when executed by at least one hardware processor included in the processing system, cause the at least one hardware processor to perform operations comprising:
   obtaining target textual data;
   obtaining input data that includes at least one topic with a plurality of specified keywords for the at least one topic;
   for each corresponding one of the plurality of specified keywords for the at least one topic, performing a query to retrieve a descriptive text body that is associated with the corresponding one of the plurality of specified keywords, wherein the descriptive text body includes multiple different sentences;
   generating a first plurality of sentences from the target textual data;
   generating a second plurality of sentences from each of the descriptive text bodies retrieved in connection with each corresponding keyword;
   for each corresponding one of the first plurality of sentences, calculating a plurality of sentence similarity metrics between the corresponding one of the first plurality of sentences and each one of the sentences in the second plurality of sentences; and
   for each corresponding one of the first plurality of sentences, calculating a metric between the corresponding one of the first plurality of sentences and the at least one topic based on multiple ones of the calculated plurality of sentence similarity metrics for the corresponding one of the first plurality of sentences.

2. The computer system of claim 1, wherein the operations further comprise:
generating a first plurality of vector sentences by transforming each sentence of the first plurality of sentences into a corresponding vector of numbers; and
generating a second plurality of vector sentences by transforming each sentence of the second plurality of sentences into a corresponding vector of numbers,
wherein the plurality of sentence similarity metrics between the corresponding one of the first plurality of sentences and each one of the sentences in the second plurality of sentences is calculated by the corresponding vector of numbers of each sentence.

3. The computer system of claim 2, wherein the plurality of sentence similarity metrics are calculated by using a Cosine similarity metric.

4. The computer system of claim 2, wherein the first and second plurality of vector sentences are generated by applying the first and second plurality of sentences to ROBERTa.

5. The computer system of claim 1, wherein the operations further comprise:
ranking the plurality of sentence similarity metrics from most similar to least similar,
wherein calculation of the metric between the corresponding one of the first plurality of sentences and the at least one topic is performed by averaging the multiple ones of the calculated plurality of sentence similarity metrics.

6. The computer system of claim 5, wherein the multiple ones of the calculated plurality of sentence similarity metrics is at least a top three of the ranked plurality of sentence similarity metrics.

7. The computer system of claim 1, wherein the operations further comprise:
comparing a threshold to the calculated metric between the corresponding one of the first plurality of sentences and the at least one topic; and
assigning a positive indicator for the at least one topic to the corresponding one of the first plurality of sentences based on the calculated metric meeting or exceeding the threshold.

8. The computer system of claim 1, wherein the operations further comprise:
generating a report that includes each one of the first plurality of sentences and an indicator for whether or not each one of the at least one topics is determined to be present within each corresponding one of the first plurality of sentences.

9. The computer system of claim 1, wherein the operations further comprise:
performing, for each one of the first plurality of sentences, a sentiment analysis process; and
assigning a sentiment value to each of the first plurality of sentences.

10. The computer system of claim 1, wherein the operations further comprise:
obtaining, by using a network graph, an initial dataset of keyword suggestions that is based on one of the keywords of the plurality of specified keywords for the at least one topic;
performing a first filtering process to remove a first subset of keywords from the initial dataset of keyword suggestions to thereby obtain an intermediate dataset of suggested keywords; and
performing a second filtering process, which is different from the first filtering process, on the intermediate dataset of suggested keywords to thereby obtain a dataset of relevant keyword suggestions for the one of the keywords of the plurality of specified keywords.

11. The computer system of claim 10, wherein the operations further comprise:
adding at least one of the keywords from the dataset of relevant keyword suggestions to the plurality of specified keywords for the at least one topic.

12. A method of performing natural language processing on a computer system, the method comprising:
obtaining target textual data;
obtaining input data that includes at least one topic with a plurality of specified keywords for the at least one topic;
for each corresponding one of the plurality of specified keywords for the at least one topic, performing a query to retrieve an expanded body of text that is associated with the corresponding one of the plurality of specified keywords, wherein the expanded body of text includes multiple different sentences;
generating a first plurality of sentences from the target textual data;
generating a second plurality of sentences that is based on each of the expanded text bodies retrieved in connection with each corresponding keyword;
for each corresponding one of the first plurality of sentences, calculating a plurality of sentence similarity metrics between the corresponding one of the first plurality of sentences and each one of the sentences in the second plurality of sentences; and
for each corresponding one of the first plurality of sentences, calculating a metric between the corresponding one of the first plurality of sentences and the at least one topic based on multiple ones of the calculated plurality of sentence similarity metrics for the corresponding one of the first plurality of sentences.

13. The method of claim 12, further comprising:
generating a first plurality of vector sentences by transforming each sentence of the first plurality of sentences into a corresponding vector of numbers; and
generating a second plurality of vector sentences by transforming each sentence of the second plurality of sentences into a corresponding vector of numbers,
wherein the plurality of sentence similarity metrics between the corresponding one of the first plurality of sentences and each one of the sentences in the second plurality of sentences is calculated by the corresponding vector of numbers of each sentence.

14. The method of claim 13, wherein the plurality of sentence similarity metrics are calculated by using a Cosine similarity metric.

15. The method of claim 13, wherein the first and second plurality of vector sentences are generated by applying the first and second plurality of sentences to ROBERTa.

16. The method of claim 12, further comprising:
ranking the plurality of sentence similarity metrics from most similar to least similar,
wherein calculation of the metric between the corresponding one of the first plurality of sentences and the at least one topic is performed by averaging the multiple ones of the calculated plurality of sentence similarity metrics.

17. The method of claim 16, wherein the multiple ones of the calculated plurality of sentence similarity metrics is at least a top three of the ranked plurality of sentence similarity metrics.

18. A non-transitory computer readable storage medium storing instructions for use with a computer system, the computer system including at least one hardware processor, the stored instructions comprising instructions that are configured to cause at least on hardware processor to perform operations comprising:
 obtaining target textual data;
 obtaining input data that includes at least one topic with a plurality of specified keywords for the at least one topic;
 for each corresponding one of the plurality of specified keywords for the at least one topic, performing a query to retrieve an expanded body of text that is associated with the corresponding one of the plurality of specified keywords, wherein the expanded body of text includes multiple different sentences;
 generating a first plurality of sentences from the target textual data;
 generating a second plurality of sentences that is based on each of the expanded text bodies retrieved in connection with each corresponding keyword;
 for each corresponding one of the first plurality of sentences, calculating a plurality of sentence similarity metrics between the corresponding one of the first plurality of sentences and each one of the sentences in the second plurality of sentences; and
 for each corresponding one of the first plurality of sentences, calculating a metric between the corresponding one of the first plurality of sentences and the at least one topic based on multiple ones of the calculated plurality of sentence similarity metrics for the corresponding one of the first plurality of sentences.

19. The non-transitory computer readable storage medium of claim 18, wherein the operations further comprise:
 generating a first plurality of vector sentences by transforming each sentence of the first plurality of sentences into a corresponding vector of numbers; and
 generating a second plurality of vector sentences by transforming each sentence of the second plurality of sentences into a corresponding vector of numbers,
 wherein the plurality of sentence similarity metrics between the corresponding one of the first plurality of sentences and each one of the sentences in the second plurality of sentences is calculated by the corresponding vector of numbers of each sentence.

20. The non-transitory computer readable storage medium of claim 19, wherein the plurality of sentence similarity metrics are calculated by using a Cosine similarity metric.

* * * * *